United States Patent
Eum et al.

(10) Patent No.: US 9,131,348 B2
(45) Date of Patent: Sep. 8, 2015

(54) MOBILE TERMINAL AND CONTROLLING METHOD THEREOF

(71) Applicant: LG ELECTRONICS INC., Seoul (KR)

(72) Inventors: Hyejin Eum, Seoul (KR); Hyunjin Kim, Seoul (KR); Mihyun Park, Seoul (KR); Seonghyok Kim, Seoul (KR); Hongjo Shim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 106 days.

(21) Appl. No.: 14/055,689

(22) Filed: Oct. 16, 2013

(65) Prior Publication Data

US 2014/0141800 A1 May 22, 2014

(30) Foreign Application Priority Data

Nov. 16, 2012 (KR) .......................... 10-2012-0130268

(51) Int. Cl.
*H04W 24/00* (2009.01)
*H04W 4/04* (2009.01)

(52) U.S. Cl.
CPC .................................... *H04W 4/043* (2013.01)

(58) Field of Classification Search
USPC ............................................ 455/456.1, 456.5
See application file for complete search history.

(56) References Cited

U.S. PATENT DOCUMENTS

2011/0009056 A1* 1/2011 Hanson et al. ................... 455/9

\* cited by examiner

*Primary Examiner* — Joel Ajayi
(74) *Attorney, Agent, or Firm* — Lee, Hong, Degerman, Kang & Waimey

(57) ABSTRACT

A mobile terminal and controlling method thereof are disclosed, which facilitates a terminal to be used in further consideration of user's convenience. The present invention includes sensing a humidity through a humidity sensor, receiving an AP (access point) location information through a wireless communication unit if a variation amount of the sensed humidity per unit time is equal to or greater than a prescribed value, determining whether a current location is an indoor space or an outdoor space based on the received AP location information, and activating a function of indoor location measurement if the determined location is the indoor space. The present invention determines a timing point of an outdoor-to-indoor or indoor-to-outdoor location shift of a mobile terminal and then activates an indoor location measuring function based on the result of the determination.

20 Claims, 15 Drawing Sheets

FIG. 6
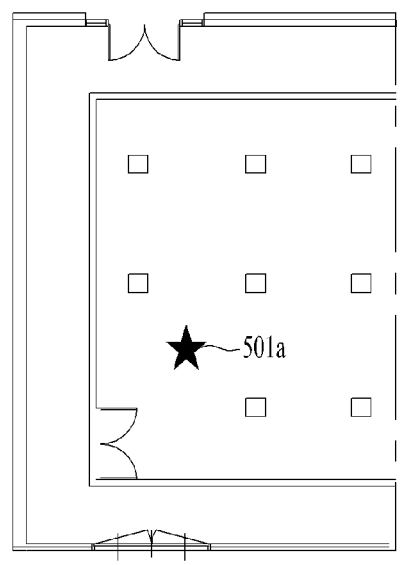

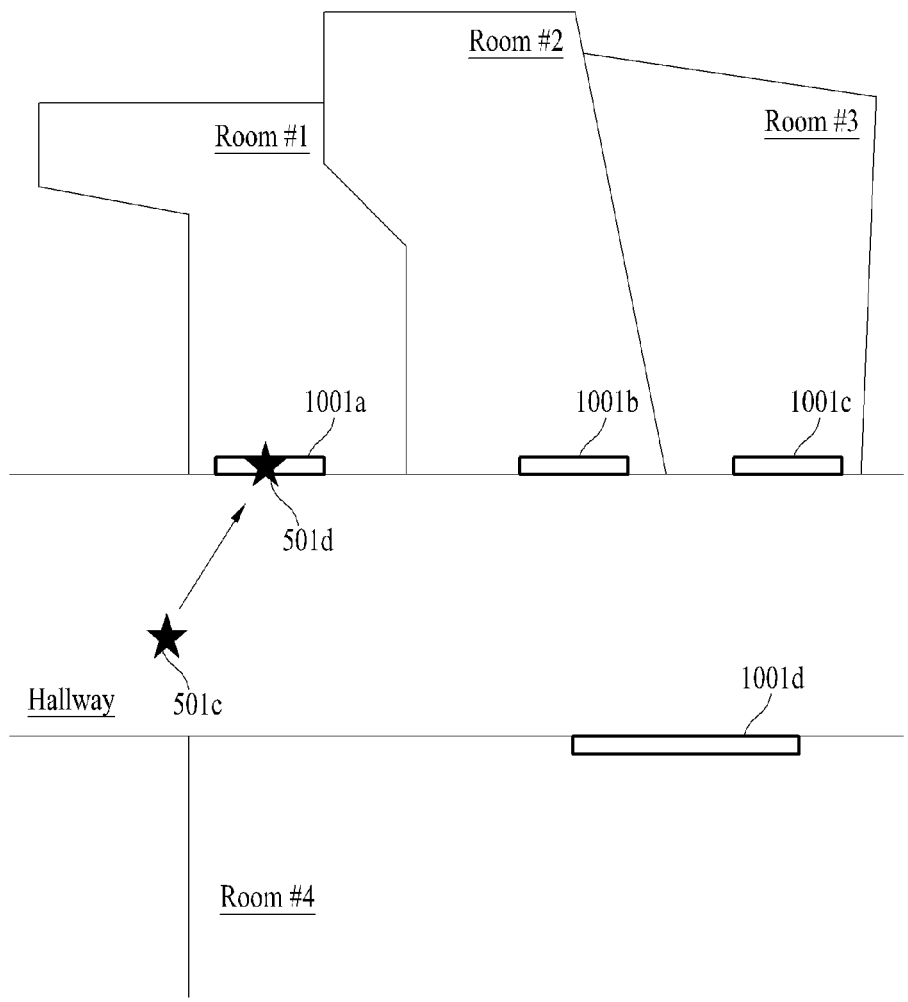

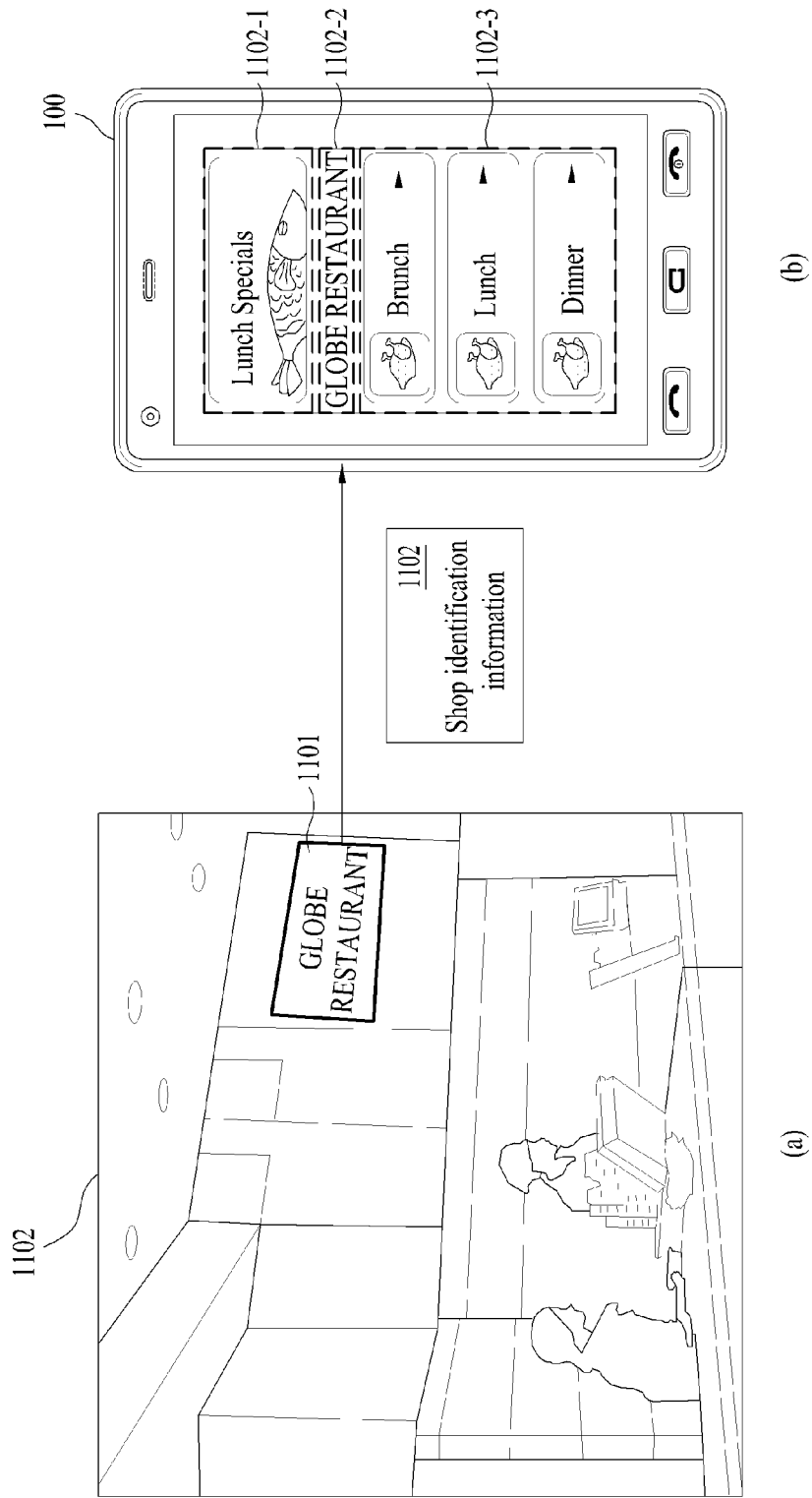

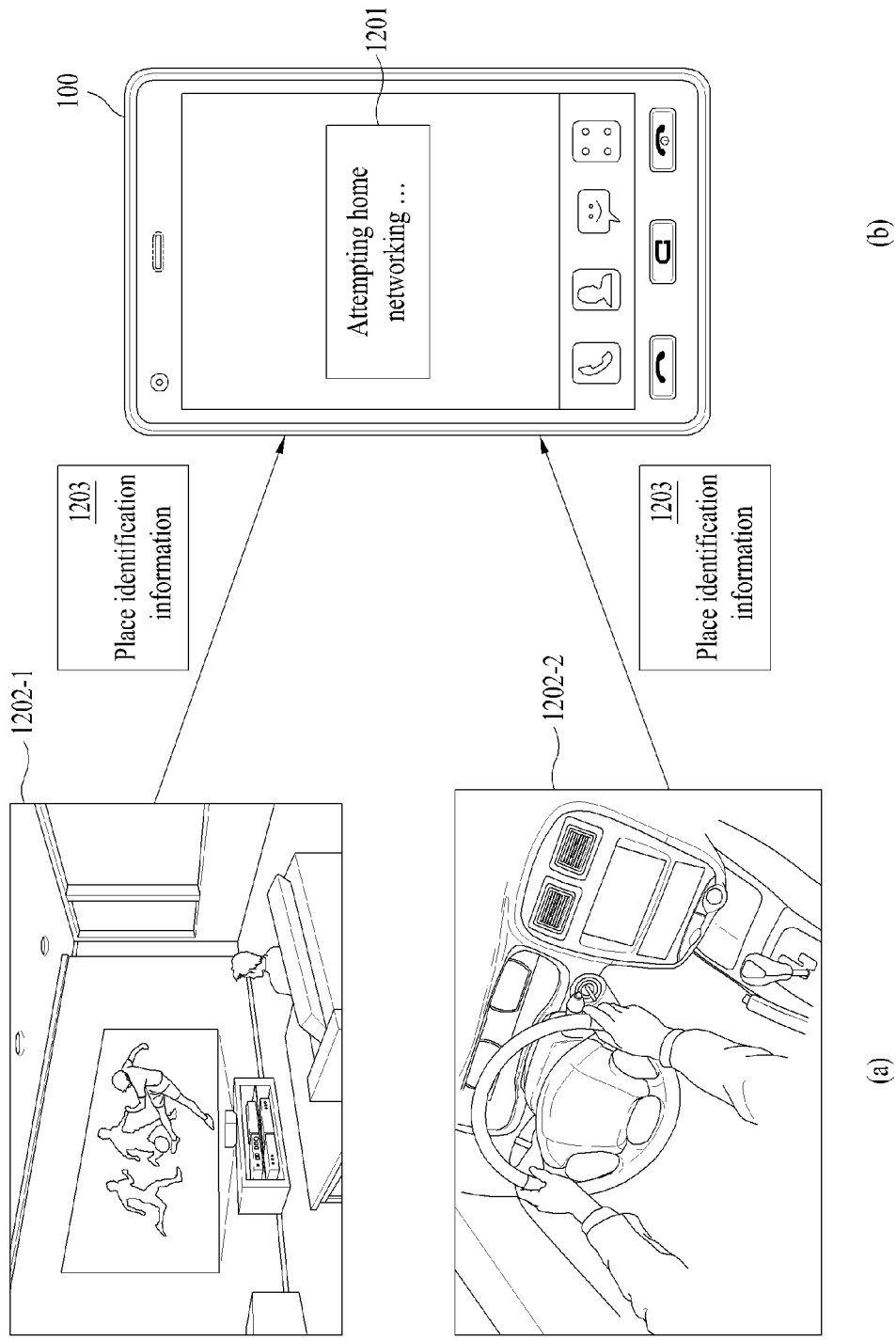

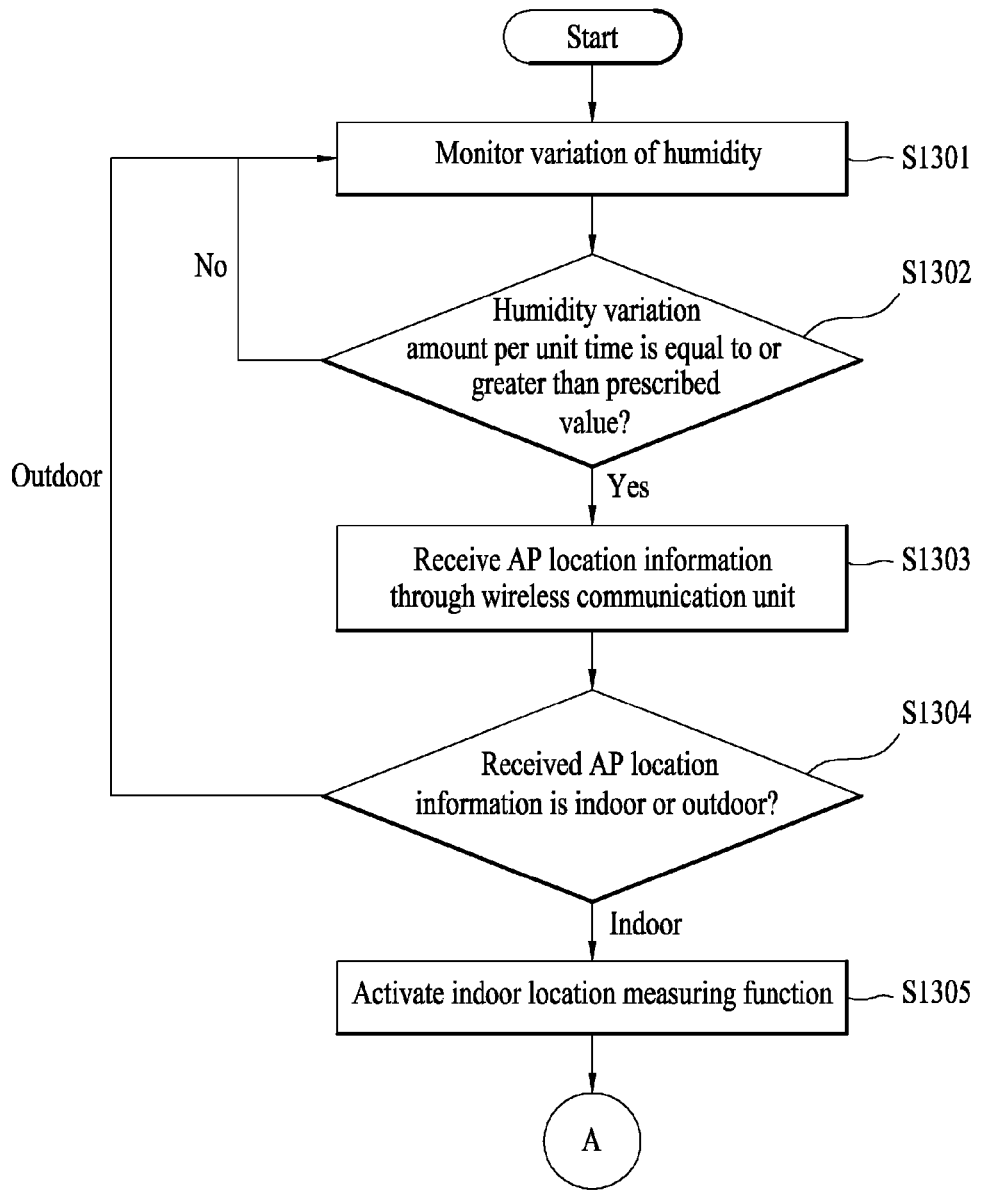

MOBILE TERMINAL AND CONTROLLING METHOD THEREOF

Pursuant to 35 U.S.C. §119(a), this application claims the benefit of earlier filing date and right of priority to Korean Application No. 10-2012-0130268, filed on Nov. 16, 2012, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for facilitating a terminal to be used in further consideration of user's convenience.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Recently, many ongoing efforts are made to research and develop methods of measuring a current indoor location of a mobile terminal accurately using the mobile terminal. In order to accurately measure an indoor location, it is necessary to accurately determine whether a current location of a mobile terminal is an indoor location or an outdoor location. Therefore, in order to determine whether a location of a mobile terminal is an indoor location or an outdoor location, methods of utilizing various sensors combinably in multiple ways need to be developed.

SUMMARY OF THE INVENTION

Accordingly, embodiments of the present invention are directed to a mobile terminal and controlling method thereof that substantially obviate one or more problems due to limitations and disadvantages of the related art.

An object of the present invention is to provide a mobile terminal and controlling method thereof, by which whether a location of a mobile terminal is an indoor location or an outdoor location can be accurately measured in performing indoor location measurement.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to the present invention may include a humidity sensor, a wireless communication unit, and a controller sensing a humidity through the humidity sensor, the controller receiving an AP (access point) location information through the wireless communication unit if a variation amount of the sensed humidity per unit time is equal to or greater than a prescribed value, the controller determining whether a current location is an indoor space or an outdoor space based on the received AP location information, the controller activating a function of indoor location measurement if the determined location is the indoor space.

In another aspect of the present invention, a method of controlling a mobile terminal according to the present invention may include the steps of sensing a humidity through a humidity sensor, receiving an AP (access point) location information through a wireless communication unit if a variation amount of the sensed humidity per unit time is equal to or greater than a prescribed value, determining whether a current location is an indoor space or an outdoor space based on the received AP location information, and activating a function of indoor location measurement if the determined location is the indoor space.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 6 is a diagram for one example of reducing an error of indoor location measurement according to one embodiment of the present invention;

FIG. 10 is a diagram for one example of a method of modifying an error of a location estimated by detecting a variation of humidity according to one embodiment of the present invention;

FIG. 11 is a diagram for one example of a method of obtaining an identification information of a room through an inputted photo and then outputting the obtained identification information according to one embodiment of the present invention;

FIG. 12 is a diagram for one example of a method of attempting a networking based on a variation of humidity according to another embodiment of the present invention; and FIG. 13A and FIG. 13B are flowcharts of a method of measuring an indoor location according to one embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile terminals, such as mobile phones, user equipment, smart phones, mobile computers, digital broadcast terminals, personal digital assistants, portable multimedia players (PMP) and navigators.

Figure 1:
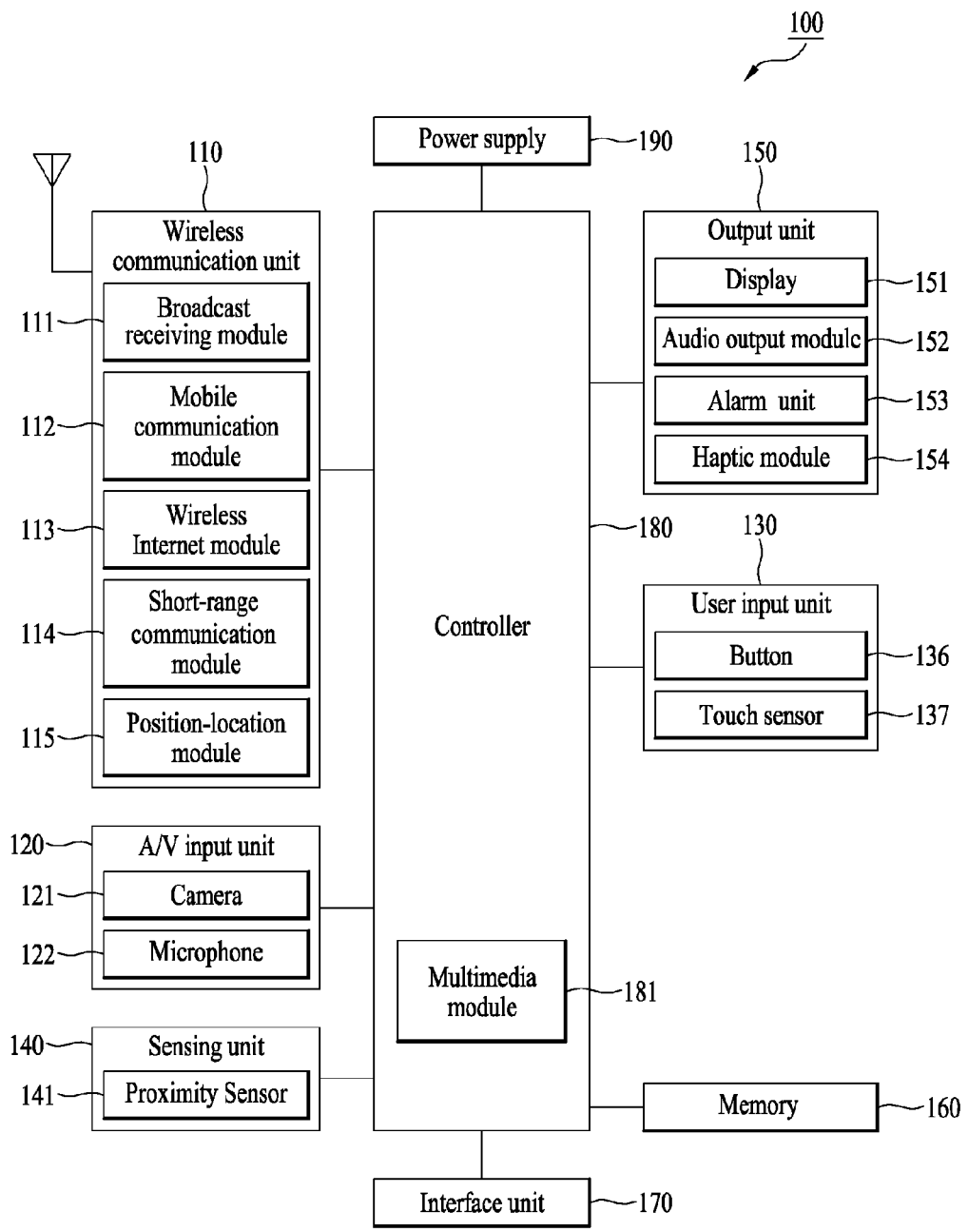
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, and free-falling of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
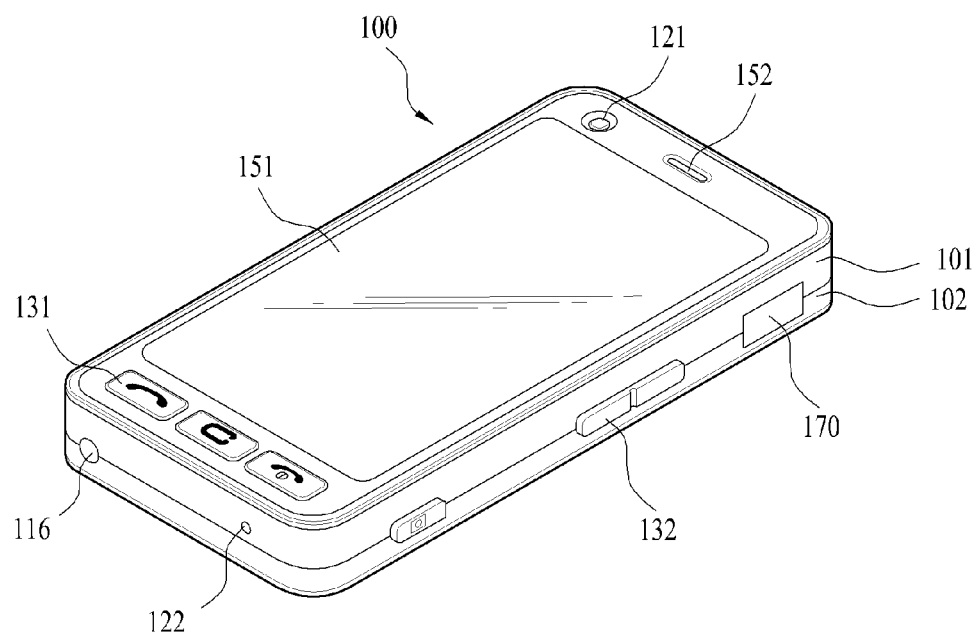
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 2B:
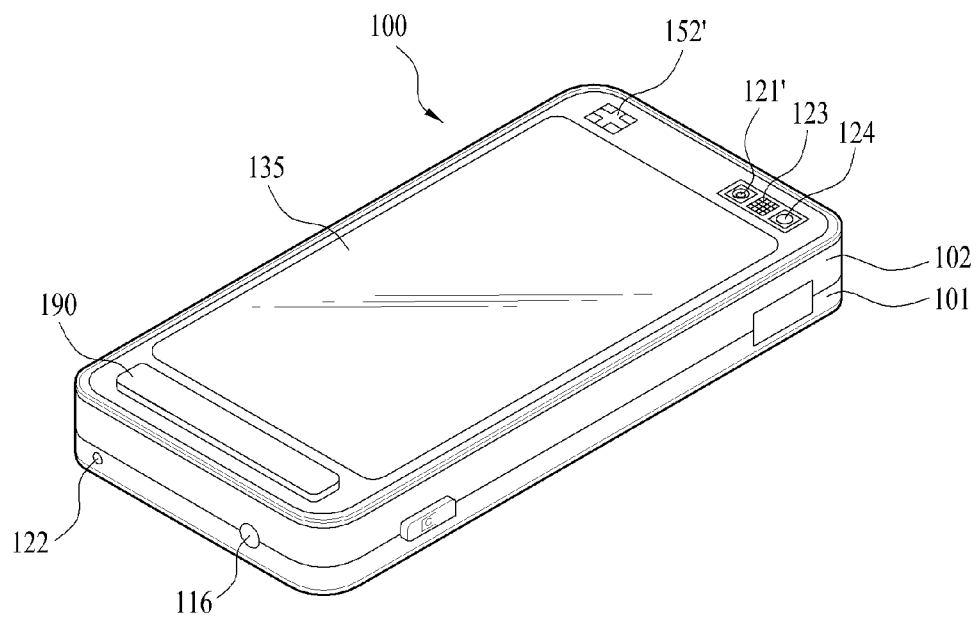
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

Recently, in estimating an indoor location using a mobile terminal, how to discriminate an indoor location and an outdoor location from each other is a major issue. This is because an error of an estimated location can be modified owning to the discrimination between the indoor location and the outdoor location.

Moreover, since an indoor location measurement consumes a considerable amount of power, it may be difficult to turn on an indoor location measuring function all the time. Hence, if an indoor location and an outdoor location are discriminated from each other, it is able to minimize power consumption by activating the indoor location measuring function in response to a determination of the indoor location.

Therefore, the present invention proposes embodiments of a method of reducing an error of an indoor location measurement using a humidity sensor and a method of reducing an error generated from measuring an indoor location.

In the following description, embodiments relating to a controlling method implemented in the above-configured mobile terminal shall be explained with reference to the accompanying drawings.

Figure 3:
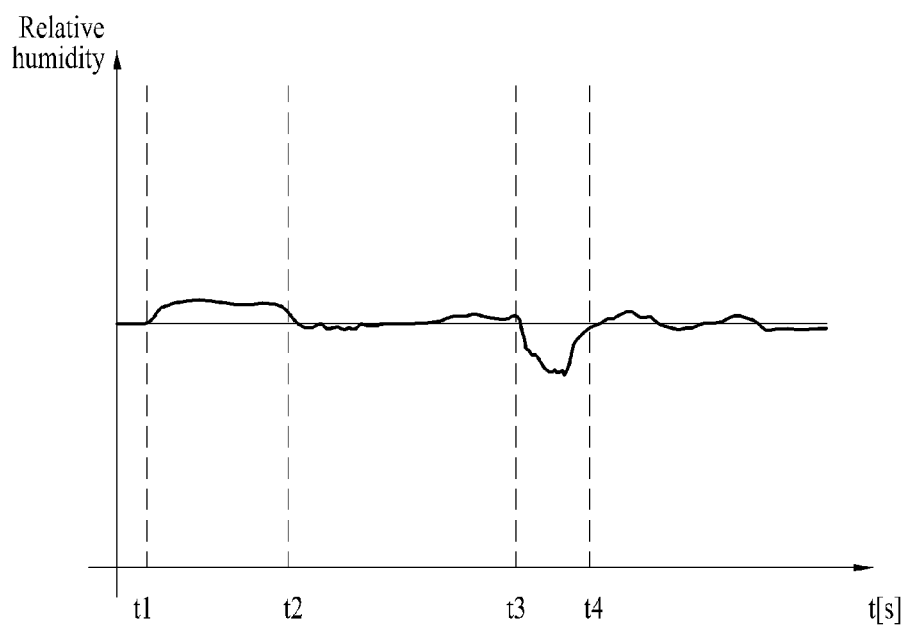
FIG. 3 is a graph of variation of humidity depending on a location shift of a mobile terminal.

FIG. 3 is a graph of variation of humidity depending on a location shift of a mobile terminal. In particular, the humidity mentioned in the present invention can include relative humidity and absolute humidity. Although the following description in this disclosure is made based on the relative humidity, it is apparent that the following description is applicable to a case of using the absolute humidity.

Referring to FIG. 3, a measured relative humidity indicates a relative humidity that varies when a location of a mobile terminal moves between an indoor space and an outdoor space. The mobile terminal has moved away from the indoor space into the outdoor space at a time t1 and a location of the mobile terminal is shifted to the indoor space from the outdoor space at a time t2. Looking into a variation amount of the relative humidity per unit time between t1 and t2, it can be observed that a value of the relative humidity has rapidly changed. Likewise, the mobile terminal has moved away from the indoor space into the outdoor space at a time t3 and a location of the mobile terminal is shifted to the indoor space from the outdoor space at a time t4.

An indoor environment rapidly becomes different from an outdoor environment to maintain a temperature suitable for human activity. Thus, as the environment changes, the relative humidity can change rapidly as well.

Therefore, the present invention proposes to utilize a humidity sensor of a mobile terminal in discriminating an indoor space and an outdoor space from each other.

In particular, while a relative humidity is monitored using the humidity sensor, if a variation amount of the relative humidity per unit time is equal to or greater than a prescribed value, the controller 180 of the mobile terminal can determine whether a location of the mobile terminal is shifted to an outdoor space from an indoor space or to the indoor space from the outdoor space.

In aspect of power, even if such a monitoring is performed using the humidity sensor, since a power value consumed by the humidity sensor itself is about 300 micro-Amperes, the corresponding power value almost has no influence on the overall power consumed by the mobile terminal Therefore, according to embodiments of the present invention, a variation amount of humidity is monitored by keeping the humidity sensor active.

Indoor location measuring techniques disclosed in the present invention can be classified into the following two types for example, by which the scope of the appended claims and their equivalents may be non-limited.

First of all, a $1^{st}$ type of the indoor location measuring technique may include triangulation using a strength of a signal generated from a short-range communication AP (access point). This technique shall be described in detail with reference to FIG. 4 as follows.

Figure 4:
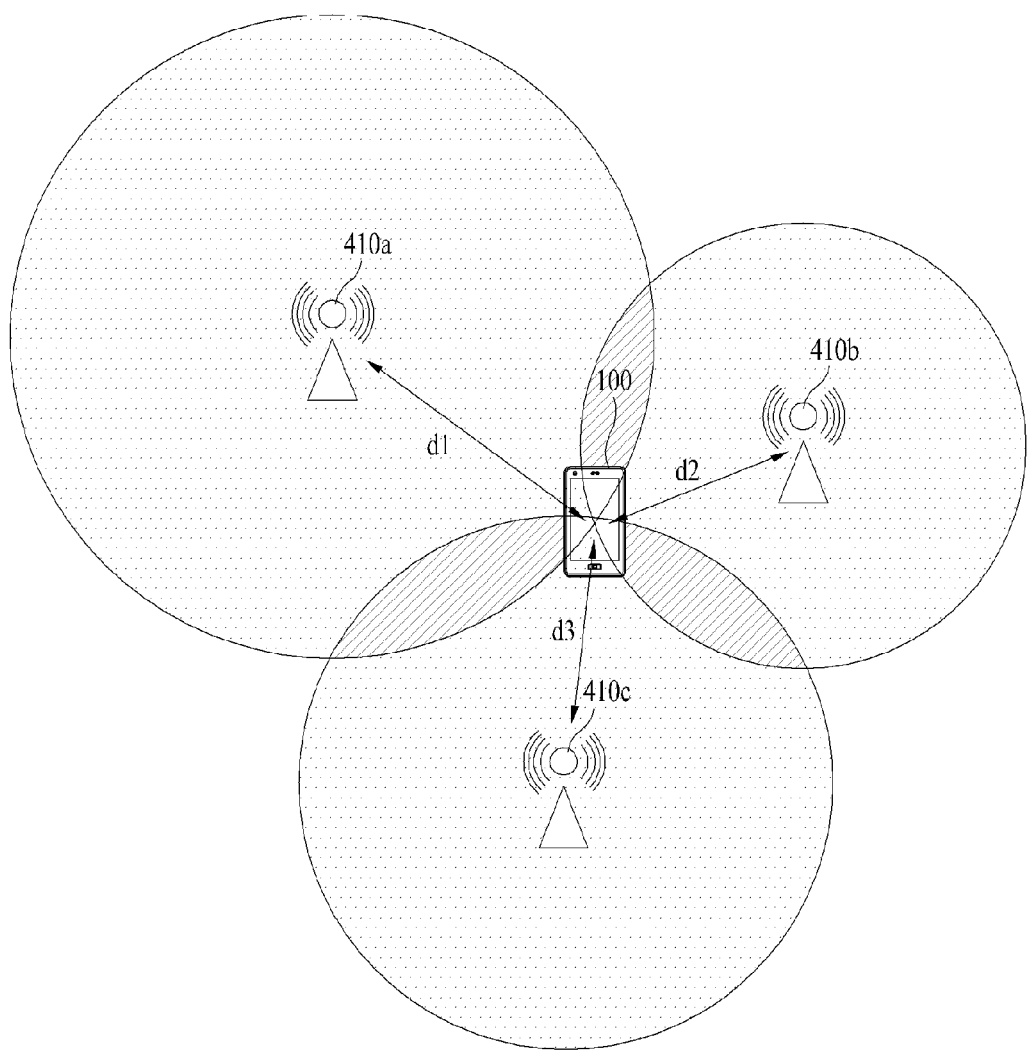
FIG. 4 is a diagram for one example of measuring an indoor location according to one embodiment of the present invention.

FIG. 4 is a diagram for one example of measuring an indoor location according to one embodiment of the present invention.

Referring to FIG. 4, the mobile terminal 100 receives a signal from each of 3 Wi-Fi APs 401.

The strength of the signal generated from the Wi-Fi AP 401 decreases depending on a distance between the corresponding Wi-Fi AP 401 and the mobile terminal 100. Hence, in case of detecting the strength of the signal received from the Wi-Fi AP 401, the mobile terminal 100 can calculate a distance d1/d2/d3 to the corresponding Wi-Fi AP 401 based on the detected strength.

The mobile terminal 100 can determine its location coordinates, as shown in FIG. 4, by applying the triangulation using the location coordinates informations of the Wi-Fi APs 401 and the calculated distances d1, d2 and d3.

In FIG. 4, the mobile terminal 100 determines its location using the 3 Wi-Fi APs 401a, 410b and 410c. On the other hand, if the mobile terminal 100 determines a location using one or two Wi-Fi APs, it is disadvantageous in that the mobile terminal 100 is unable to determine its precise location. Such a disadvantage shall be described with reference to FIG. 5 as follows.

Figure 5:
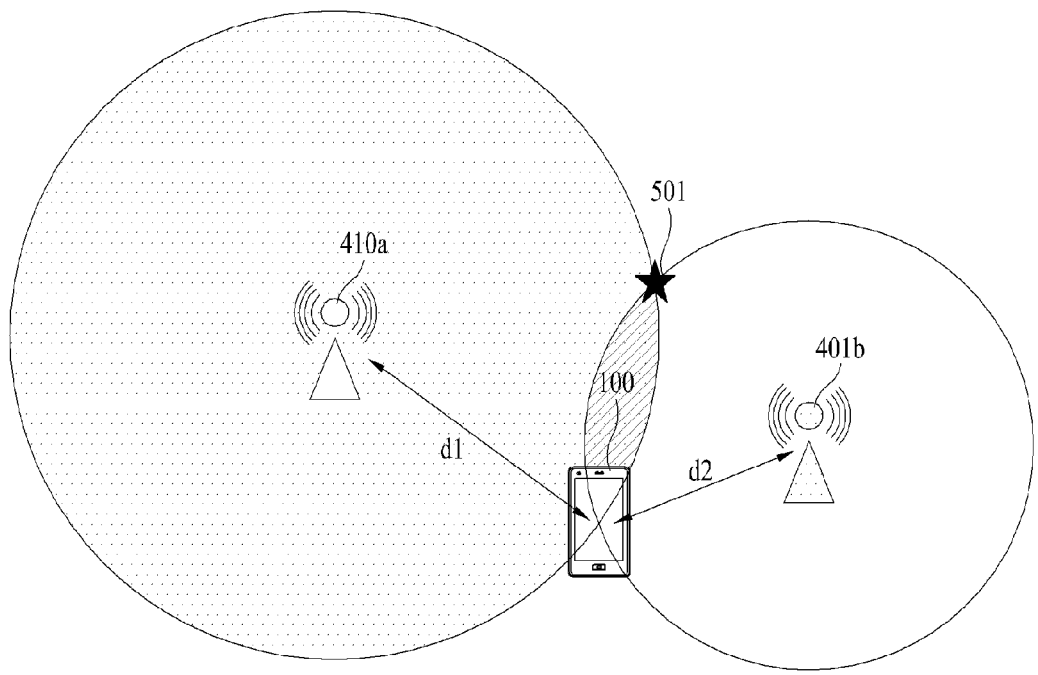
FIG. 5 is a diagram to describe a problem of an indoor location measuring method according to one embodiment of the present invention.

FIG. 5 is a diagram to describe a problem of an indoor location measuring method according to one embodiment of the present invention.

Referring to FIG. 5, the mobile terminal 100 determines its location based on signals received from two Wi-Fi APs 401 (401a, 401b).

In doing so, the mobile terminal 100 may estimate an incorrect location 501 as its location together with a correct location at which the mobile terminal 100 is actually located.

This is because the incorrect location 501 has the same distances d1 to the Wi-Fi AP 401a and the same distance d2 to the Wi-Fi AP 401b.

Thus, if the mobile terminal 100 estimates its location using the triangulation, a probability of error occurrence may increases higher if using a smaller number of short-range communication AP(s).

Therefore, according to embodiments of the present invention, the incorrect location 501 is determined as an invalid location and a method of determining a valid location, at which the mobile terminal 100 is actually located, is proposed.

FIG. 6 is a diagram for one example of reducing an error of indoor location measurement according to one embodiment of the present invention.

Referring to FIG. 6, an indoor layout is illustrated. And, a location 501 estimated by triangulation is marked on the indoor layout.

According to an embodiment of the present invention, the mobile terminal 100 may save indoor layout information in the memory 160. Alternatively, the mobile terminal 100 can receive the indoor layout information via the wireless communication unit 110 if necessary.

In FIG. 6, as mentioned in the foregoing description with reference to FIG. 5, it is able to obtain two estimated locations 501 (501a, 501b) by triangulation. In particular, one of the two estimated locations 501 may include the location at which the mobile terminal 100 is actually located, while the other may include an incorrect location.

In more particular, in the example shown in FIG. 6, assuming that the location 501a is the actual location of the mobile terminal 100, the other location 501b is the location incorrectly estimated by the triangulation. Therefore, according to an embodiment of the present invention, proposed is a method of modifying the incorrectly estimated location in a manner of discriminating an indoor space and an outdoor space from each other.

First of all, if the controller determines that a location of the mobile terminal 100 is an indoor space, the controller 180 determines that the estimated outdoor location 501b is an invalid location and also determines that the estimated indoor location 501a is a valid location only.

Namely, if the mobile terminal 100 is determined as located in the indoor space, it is able to correct the incorrect location estimated by the triangulation.

Meanwhile, the second type of the indoor location measuring technique includes a method of using a mapping of a short range communication AP signal. This shall be described in detail with reference to FIG. 7 as follows.

Figure 7:
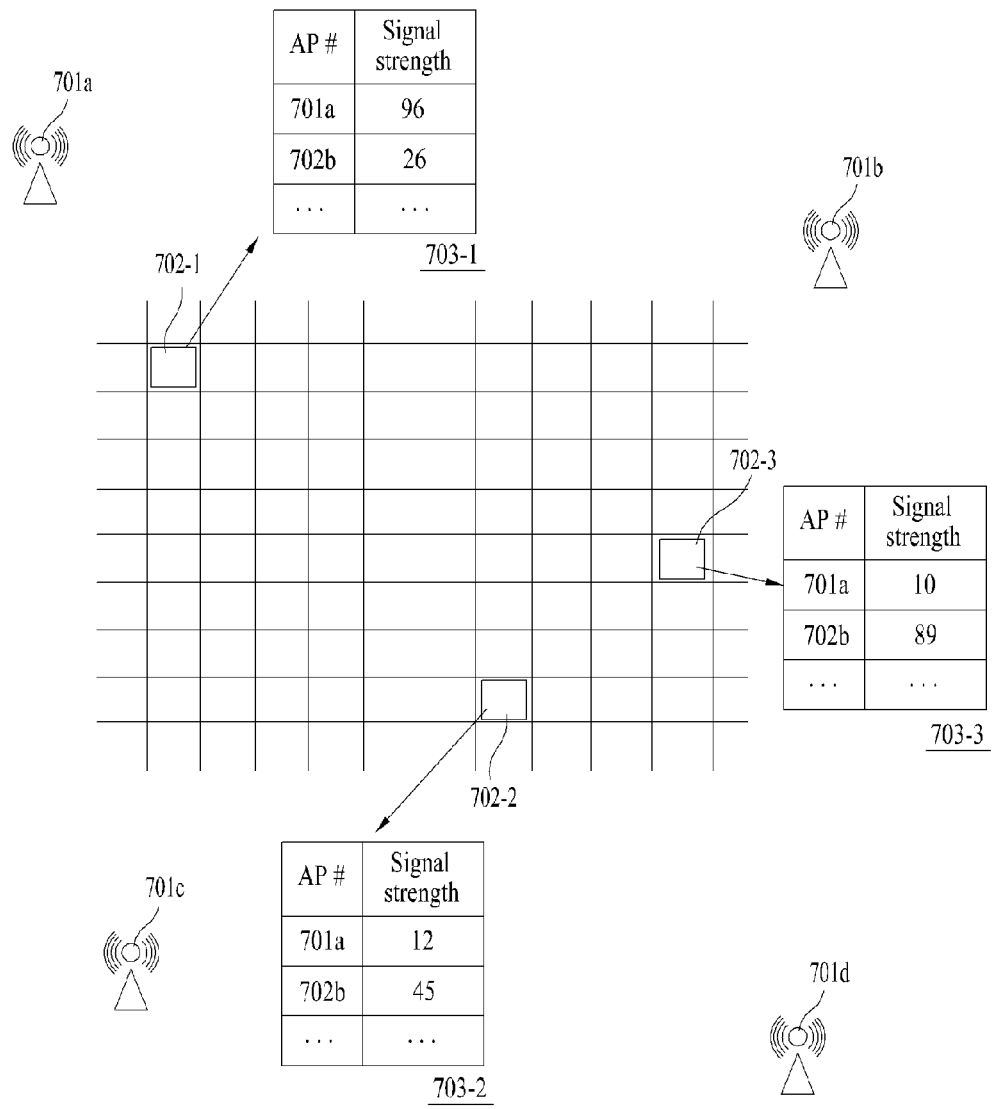
FIG. 7 is a diagram for one example of a method of measuring an indoor location according to one embodiment of the present invention.

FIG. 7 is a diagram for one example of a method of measuring an indoor location according to one embodiment of the present invention.

Referring to FIG. 7, there are four short range communication APs 701 (701a, 701b, 701c and 701d).

According to this indoor location measuring method, the mobile terminal 100 can estimate a location in an indoor space using mapping data. In this case, the mapping data may include such data as follows. First of all, an indoor space is divided into a plurality of regions 702 using a grid. And, a strength of a signal, which is received from an AP and detected by each of a plurality of the regions 702, differs in each of the regions 702. For instance, regarding the region 702-1, since a distance from the $1^{st}$ AP 801a is close, the strength of the signal generated from the $1^{st}$ AP 701a is the strongest in the region 702-1. Thus, the strengths of the signals from a plurality of the APs 701 are detected and can be then saved as a table 703-1 by being mapped to the corresponding APs 701, respectively. Likewise, for example, strengths of the detected signals from a plurality of the APs can be saved as a table 703-2 for the region 702-2. And, strengths of the detected signals from a plurality of the APs can be saved as a table 703-3 for the region 702-3.

Thus, for the indoor space divided into a plurality of the regions 702, if the entire data corresponding to the information for each of the regions 702 are saved as tables 703, it is named mapping data.

The mobile terminal 100 can estimate an indoor location using the mapping data. In particular, the mobile terminal 100 detects strengths of a plurality of AP signals at a location to estimate and then compares a plurality of the signals to the mapping data. As a result of the comparison, the mobile terminal 100 can estimate the region 702 most similar to the strengths of the AP signals as a current location of the mobile terminal 100.

Meanwhile, according to the above-described triangulation or the AP signal mapping, a signal strength of the short range communication AP needs to keep being monitored, which may consume considerable power. In order to determine an actual power consumption rate, a consumed current is described with reference to FIG. 8 as follows.

Figure 8:
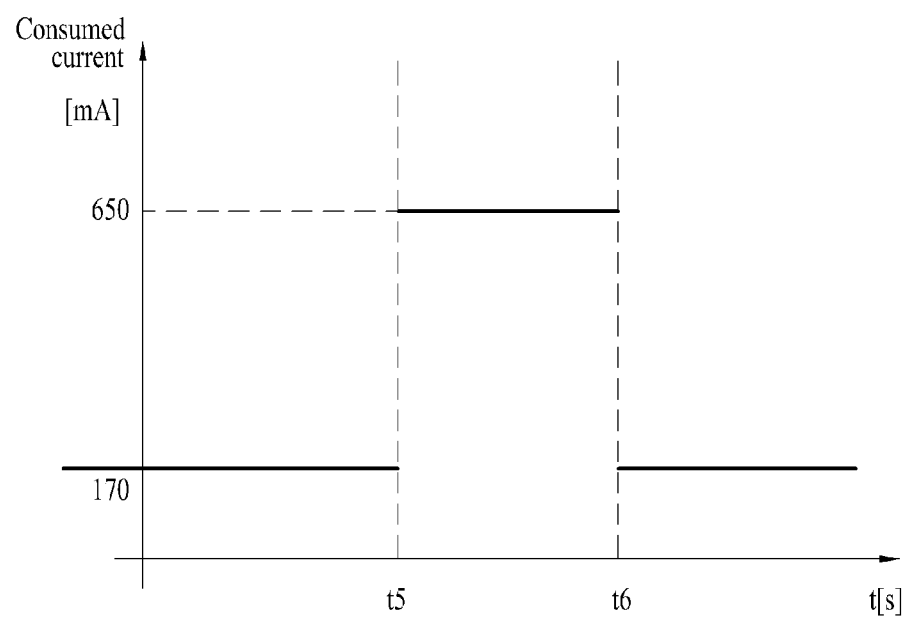
FIG. 8 is a graph of a current consumed by an indoor location measurement according to one embodiment of the present invention.

FIG. 8 is a graph of a current consumed by an indoor location measurement according to one embodiment of the present invention.

Referring to FIG. 8, an indoor location measuring function is active between t5 and t6 but inactive in the rest of the regions except the region between t5 and t6.

If the indoor location measuring function is active, a consumed current amounts to 650 mA, which is four times greater than 170 mA corresponding to a current consumed in case that the indoor location measuring function is inactive. Therefore, according to an embodiment of the present invention, if the indoor location measuring function keeps being active, it is inefficient in consideration of the consumed power.

According to one embodiment of the present invention, it is proposes that an indoor location measuring function is activated if determining that the mobile terminal 100 is located in an indoor space.

Figure 9:
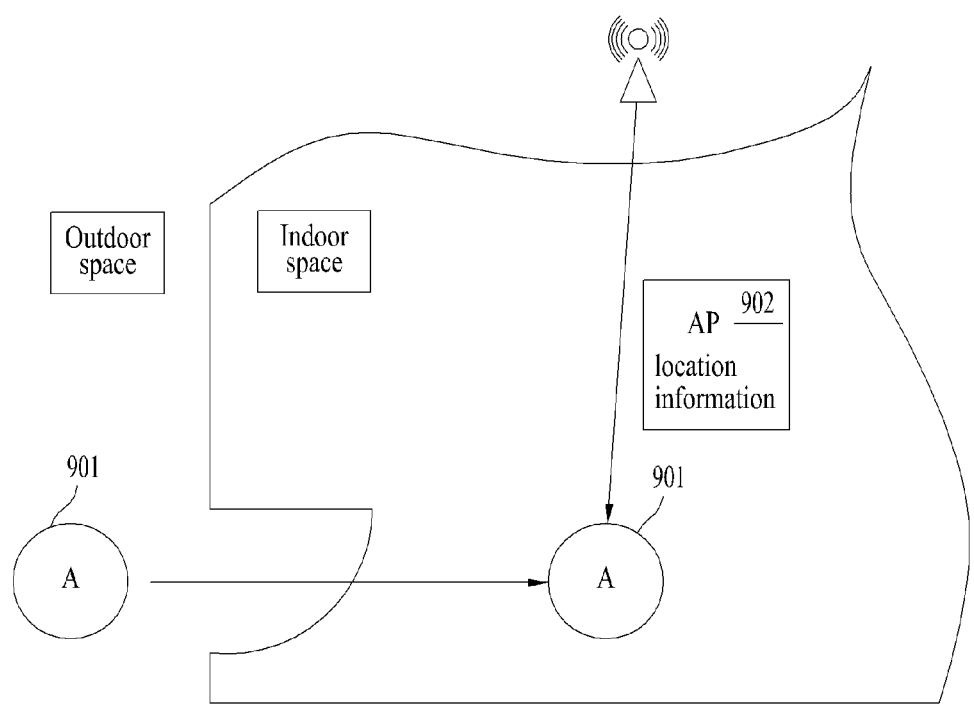
FIG. 9 is a diagram for one example of a method of activating an indoor location measuring function according to one embodiment of the present invention.

FIG. 9 is a diagram for one example of a method of activating an indoor location measuring function according to one embodiment of the present invention.

Referring to FIG. 9, a user 901 of the mobile terminal 100 is located in an outdoor space by carrying the mobile terminal 100 before moving. In order to prevent a power from being wasted, assume that an indoor location measuring function is deactivated. If the user 901 moves into an indoor space from the outdoor space while carrying the mobile terminal 100, a variation amount of humidity sensed through the humidity sensor will rapidly change per unit time.

If the variation amount of the humidity per unit time is equal to or greater than a prescribed value, the controller 180 determines whether a current location of the mobile terminal 100 is in the indoor space or the outdoor space. If the controller 180 determines that the current location of the mobile terminal 100 is in the indoor space, the controller 180 activates the indoor location measuring function.

In particular, if the variation amount of the humidity per unit time is equal to or greater than the prescribed value, the controller 180 receives AP location information through the wireless communication unit 110. In this case, the AP may include an AP of short range communication.

Based on the AP location information received through the wireless communication unit 110, the controller 180 determines whether a current location of the mobile terminal 100 is an indoor space or an outdoor space. In particular, if the controller 180 determines that the corresponding AP is located at the indoor space through the received AP location information, the controller determines that the current location of the mobile terminal 100 is the indoor space. If the controller 180 determines that the corresponding AP is located at the outdoor space through the received AP location information, the controller determines that the current location of the mobile terminal 100 is the outdoor space.

Since the diagram shown in FIG. 9 assumes the case that the user 901 enters the indoor space from the outdoor space, the controller 180 of the mobile terminal 100 receives the AP location information 902 through the wireless communication unit 110 and is then able to determine that the current location of the mobile terminal 100 is the indoor space based on the received AP location information 902. Subsequently, the controller 180 can activate the indoor location measuring function. In this case, the AP location information may include a location coordinates information of the AP accessed through a short range communication network and an identification information for identifying the accessed AP. Through the identification information, the controller 180 can also determine whether the accessed AP is located at the indoor space or the outdoor space.

For instance, in case that the accessed AP is a home AP (or a company AP), it is able to determine the indoor space or the outdoor space using the identification information indicating the home AP (or the company AP) without using a detailed location. In this case, the short range communication may include Wi-Fi communication network.

Meanwhile, in determining the indoor space or the outdoor space, if any APs are not found through the wireless communication unit 110, the controller 180 may determine the outdoor space. This is because the case of the indoor space assumes a presence of the short range communication AP. If the short range communication AP does not exist in the indoor space despite the indoor space, since an indoor location measurement is not available like the case of the outdoor space, it is unnecessary to determine the indoor space.

Meanwhile, according to an embodiment of the present invention, it is able to modify an error of an estimated location by detecting a variation of humidity. A detailed method of modifying an error shall be described with reference to FIG. 10 as follows.

FIG. 10 is a diagram for one example of a method of modifying an error of a location estimated by detecting a variation of humidity according to one embodiment of the present invention.

Referring to FIG. 10, a layout of an indoor space is outputted. According to one embodiment of the present invention, an indoor layout information is saved in the memory 160. And, the indoor layout information may include at least one of a room-to-room boundary information, a room entrance location information and a room identification information.

According to one embodiment of the present invention, the mobile terminal 100 further detects that it enters an indoor space, and more particularly, a room (or a shop) in addition.

For instance, according to one embodiment of the present invention, while an indoor location measuring function is active, the controller 180 additionally detects a variation amount of humidity. If the additionally detected variation amount of the humidity per unit time is equal to or greater than a prescribed value, the controller 180 modifies a location estimated through the indoor location measuring function into a location of a rom entrance. Since a room-to-room humidity difference, a room-to-hallway humidity difference and the like exist in the same indoor space, the mobile terminal 100 further detect humidity in addition despite the active state of the indoor location measuring function.

In particular, referring to the example shown in FIG. 10, the controller 180 estimates a location 501*c* as a current location of the mobile terminal 100 through the indoor location measuring function. In doing so, if the mobile terminal 100 detects a variation of humidity, the controller 180 modifies the estimated location 501*c* into a location 501*d* of a room entrance.

Moreover, in case that the indoor layout information includes locations of a plurality of room entrances, the controller 180 modifies the estimated location into a location of a room entrance 1001*a* closest to the estimated location 501*c* among the locations of a plurality of the room entrances. This is because, when the controller 180 recognizes that the mobile terminal 100 has entered the room (or shop), it is highly probable that the mobile terminal 100 has entered the room (or shop) through the entrance 1001 closest to the estimated location.

The indoor layout exemplarily shown in FIG. 10 includes information on 4 room entrances 1001*a* to 1001*d*. In this case, the modified location of the location 501*c* modified by the controller 180 can be modified into a location 501*d* of the entrance 1001*a* closest to the estimated location 501*c*.

As mentioned in the foregoing description, when the mobile terminal 100 enters a prescribed shop in an indoor space, the mobile terminal 100 can detect that it has entered the shop. Moreover, according to embodiments of the present invention, further proposed is a method of identifying a shop using a shop identification information and/or the camera 121.

Assuming that the mobile terminal 100 has entered the room #1, the controller 180 can obtain the identification information of the rom #1 from the indoor layout information. Alternatively, the controller 180 may obtain identification information of the corresponding shop from indoor shop identification information separate from the indoor layout information. If the room #1 is a fast food shop, the controller 180 obtains the identification information of the fast food shop from the indoor layout information and is then able to display a name, menu coupon information and the like of the fast food shop for a user. Referring to FIG. 11(*b*), having obtained the identification information of the shop, the mobile terminal can output the coupon information 1102-1, the shop name 1102-2 and the menu 1102-3.

On the other hand, if the identification information of the shop is not obtained, according to one embodiment of the present invention, the controller 180 receives an input of a photo of the shop and is then able to obtain the identification information of the shop by analyzing the inputted photo. In particular, a method of obtaining an identification information of a shop is described in detail with reference to FIG. 11 as follows.

FIG. 11 is a diagram for one example of a method of obtaining an identification information of a room through an inputted photo and then outputting the obtained identification information according to one embodiment of the present invention.

Referring to FIG. 11, the mobile terminal 100 receives an input of a photographed shop photo 1102. The controller 180 can obtain an identification information 1101 of the shop from the inputted shop photo 102.

In doing so, a method of obtaining an identification information from a photo may include any kinds of algorithms for analyzing photos.

Likewise, referring to FIG. 11(*b*), having obtained the identification information of the shop, the mobile terminal identifies the shop using the identification information of the shop and is then able to output the coupon information 1102-1, the shop name 1102-2 and the menu 1102-3.

If coupon information on all shops is simply provided to a user of the mobile terminal 100, it may be difficult for the user to use proper coupons among numerous coupons. Therefore, according to the present invention, if a user visits a shop, the user is provided with coupons related to the corresponding shop only. Thus, the user can be appropriately provided with necessary coupons.

Moreover, when the mobile terminal 100 enters a home or a car, an embodiment of the present invention can be extended to a case of attempting a networking using a variation of humidity. This embodiment is described in detail with reference to FIG. 12 as follows.

FIG. 12 is a diagram for one example of a method of attempting a networking based on a variation of humidity according to another embodiment of the present invention.

Referring to FIG. 12, when a location of the mobile terminal 100 is shifted from an outside of a home to an inside of the home or shifted from an outside of a car to an inside of the car, the mobile terminal 100 can detect a variation of humidity. According to another embodiment of the present invention, if a variation amount of the detected humidity is equal to or greater than a prescribed value, the mobile terminal 100 attempts a home networking and/or Bluetooth pairing with the car. This is because a user may attempt a connection to a network of the shifted inside at the timing point of shifting from the outside of the home to the inside of the home or shifting from the outside of the car to the inside of the car.

Referring to FIG. 12(b), in case of attempting the connection to the network, the mobile terminal 100 can output an indication message 1201 indicating that the connection to the network is in progress.

Moreover, the controller 180 detects the variation of the humidity, obtains a place identification information 1203 from a photographed photo, and may then attempt a connection to a network based on the obtained place identification information 1203.

FIG. 12(a) shows a photo 1202-1 of an inside of a home and a photo 1202-2 of an inside of a car. According to this embodiment, the controller 180 obtains a place identification information 1203 from a photo 1202 (e.g., an identification information 'home' from the photo 1202-1 and an identification information 'car' from the photo 1202-2) and is then able to attempt a connection to a home network or a car network (e.g., Bluetooth network) based on the obtained identification information.

Thus, according to an embodiment of the present invention, when a humidity variation is detected or an identification information is obtained from a photographed photo, if a connection to a network is attempted, it is advantageous in attempting an efficient connection with a power smaller than that for a case of keeping on attempting a connection to a network.

Moreover, in the method of obtaining the place identification information 1203 from the photographed photo 1202, any kinds of algorithms of obtaining a place information by analyzing a photo are applicable. For example of such a method, if a user of the mobile terminal 100 puts the mobile terminal 100 on a holder at a specific location in a home or car, the mobile terminal 100 can obtain the place identification information 1203 by setting an image, which is photographed while the mobile terminal 100 is put on the holder, as a comparison target. In particular, if the holder of the mobile terminal 10 is installed on the car, the user can photograph an image, which is to be set as the comparison target, while the mobile terminal 100 is put on the holder. Subsequently, if the controller 180 compares the photo 1202 photographed to obtain the place identification information 1203 to the comparison target image and then determines that the photographed photo 1202 is the same image of the comparison target image, the controller 180 can confirm that the location of the mobile terminal 100 is the car.

Figure 13B:
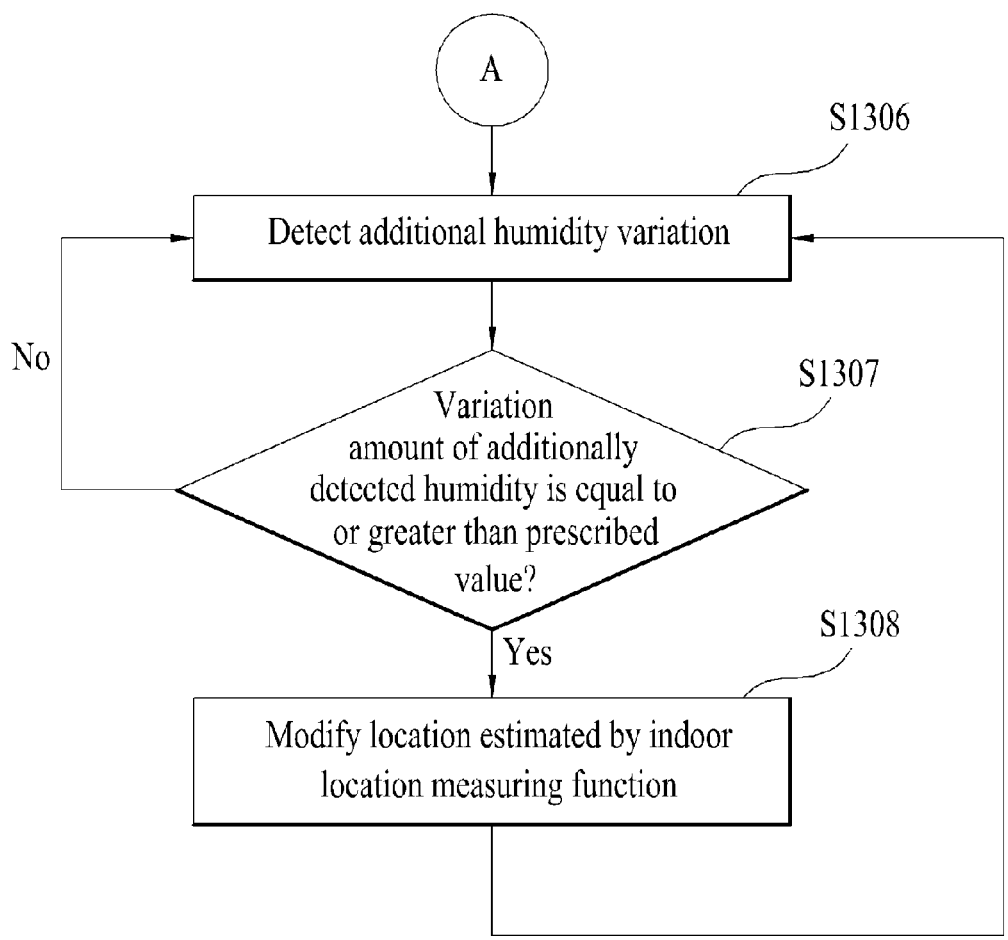

FIG. 13A and FIG. 13B are flowcharts of a method of measuring an indoor location according to one embodiment of the present invention.

Referring to FIG. 13A and FIG. 13B, in the step S1301, the controller 180 monitors a variation amount of humidity using a humidity sensor.

In the step S1302, in the course of monitoring the variation of the humidity, if the variation amount of the humidity per unit time is equal to or greater than a prescribed value, the controller 180 goes to the step S1303.

In the step S1302, in the course of monitoring the variation of the humidity, if the variation amount of the humidity per unit time is not equal to or greater than the prescribed value, the controller 180 returns to the step S1301 and then monitors the variation amount of the humidity again.

In the step S1303, the controller 180 receives AP location information via the wireless communication unit 110.

In the step S1304, based on the received AP location information, the controller 180 determines whether the AP location information corresponds to an indoor space or an outdoor space. As a result of the comparison, if the AP location information corresponds to the indoor space, the controller 180 goes to the step S1305. If the AP location information corresponds to the outdoor space, the controller 180 returns to the step S1301 and then monitors the variation amount of the humidity again.

In the step S1305, an indoor location measuring function is activated.

In the step S1306, the controller 180 additionally monitors the variation amount of the humidity.

In the step S1307, the controller 180 checks whether the variation amount of the humidity per unit time exceeds a prescribed value. If the variation amount of the humidity per unit time exceeds the prescribed value, the controller 180 goes to the step S1308.

If the variation amount of the humidity per unit time does not exceed the prescribed value, the controller 180 returns to the step S1306 and additionally monitors the variation amount of the humidity again.

In the step S1308, the controller 180 can modify a location estimated by the indoor location measuring function into another location. In doing so, a detailed method of modifying the estimated location into another location is as good as the former description explained with reference to FIG. 10 and its details shall be omitted from the following description.

Accordingly, embodiments of the present invention provide various effects and/or features.

According to at least one of embodiments of the present invention, a current location of a mobile terminal can be accurately identified as an indoor space or an outdoor space.

According to at least one of embodiments of the present invention, if a location of a mobile terminal corresponds to an indoor space, an indoor location measurement can be performed more accurately.

It will be appreciated by those skilled in the art that the present invention can be specified into other form(s) without departing from the spirit or scope of the inventions.

The above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a humidity sensor;
   a wireless communication unit; and
   a controller sensing a humidity through the humidity sensor, the controller receiving AP (access point) location information through the wireless communication unit when a variation amount of the sensed humidity per unit time is equal to or greater than a prescribed value, the controller determining whether a current location is an indoor space or an outdoor space based on the received AP location information, and the controller activating a function of indoor location measurement when the determined location is the indoor space.

2. The mobile terminal of claim 1, wherein when the determined location is the indoor space and a plurality of estimated locations obtained through the indoor location measurement include both the indoor location and the outdoor location, the controller determines that the estimated outdoor location is an invalid location.

3. The mobile terminal of claim 1, wherein the controller receives the AP location information through a short range communication network, and wherein the AP location information comprises at least location coordinates information of an AP accessed through the short range communication network or identification information of the accessed AP.

4. The mobile terminal of claim 3, wherein the short range communication network comprises a Wi-Fi network.

5. The mobile terminal of claim 1, wherein the controller receives at least AP location information or AP identification information of a plurality of APs through the wireless communication unit, wherein the controller senses signal strengths of AP signals respectively transmitted by the plurality of APs, and wherein the controller performs the indoor location measurement based on the received at least location information or identification information and the sensed signal strengths.

6. The mobile terminal of claim 5, wherein in performing the indoor location measurement, the controller obtains the AP signal strengths measured at a plurality of different points in the indoor space and then estimates the current location by comparing each of the AP signal strengths to the obtained AP signal strengths at the current location.

7. The mobile terminal of claim 5, further comprising a motion sensing unit configured to sense a motion including at least a direction or acceleration of the mobile terminal, wherein the controller performs the indoor location measurement further based on the sensed motion in performing the indoor location measurement.

8. The mobile terminal of claim 5, further comprising a memory configured to store information on an indoor layout, wherein the controller estimates a location in the indoor layout through the indoor location measurement.

9. The mobile terminal of claim 8, wherein the indoor layout information comprises at least one selected from the group consisting of a room of the indoor space, a room boundary and a room entrance location, wherein the controller further detects a variation of the humidity additionally through the humidity sensor, and wherein when an amount of the additionally detected variation of the humidity per unit time is equal to or greater than a prescribed value, the controller modifies the estimated location into the room entrance location.

10. The mobile terminal of claim 9, wherein when the indoor layout information includes locations of a plurality of room entrances, the controller modifies the estimated location into the location of the room entrance closest to the estimated location among the locations of the plurality of room entrances.

11. A method of controlling a mobile terminal, the method comprising:
    sensing a humidity through a humidity sensor;
    receiving AP (access point) location information through a wireless communication unit when a variation amount of the sensed humidity per unit time is equal to or greater than a prescribed value;
    determining whether a current location is an indoor space or an outdoor space based on the received AP location information; and
    activating a function of indoor location measurement when the determined location is the indoor space.

12. The method of claim 11, wherein when the determined location is the indoor space and a plurality of estimated locations obtained through the indoor location measurement include both the indoor location and the outdoor location, the estimated outdoor location is determined as an invalid location.

13. The method of claim 11, wherein the receiving of the AP location information comprises receiving the AP location information through a short range communication network, and wherein the AP location information comprises at least location coordinates information of an AP accessed through the short range communication network or identification information of the accessed AP.

14. The method of claim 13, wherein the short range communication network comprises a Wi-Fi network.

15. The method of claim 11, further comprising:
    receiving at least AP location information or AP identification information of a plurality of APs through the wireless communication unit;
    sensing signal strengths of AP signals respectively transmitted by the plurality of APs; and
    performing the indoor location measurement based on the received at least location information or identification information and the sensed signal strengths.

16. The method of claim 15, wherein the performing of the indoor location measurement comprises:
    obtaining the AP signal strengths measured at a plurality of different points in the indoor space; and
    estimating the current location by comparing each of the AP signal strengths to the obtained AP signal strengths at the current location.

17. The method of claim 15, further comprising sensing a motion including at least a direction or acceleration of the mobile terminal, wherein the indoor location measurement is performed further based on the sensed motion.

18. The method of claim 15, wherein the method further comprises storing information on an indoor layout, and wherein the performing of the indoor location measurement comprises estimating a location in the indoor layout through the indoor location measurement.

19. The method of claim 18, wherein the indoor layout information comprises at least one selected from the group consisting of a room of the indoor space, a room boundary and a room entrance location, wherein the performing of the indoor location measurement comprises further detecting a variation of the humidity additionally through the humidity sensor and when an amount of the additionally detected variation of the humidity per unit time is equal to or greater than a prescribed value, modifying the estimated location into the room entrance location.

20. The method of claim 19, wherein the modifying of the estimated location into the room entrance location comprises when the indoor layout information includes locations of a plurality of room entrances, modifying the estimated location into the location of the room entrance closest to the estimated location among the locations of the plurality of room entrances.

* * * * *